H. EVERSOLE.
AGRICULTURAL TRACTOR.
APPLICATION FILED MAY 31, 1912. RENEWED FEB. 12, 1917.
1,226,200.
Patented May 15, 1917.
2 SHEETS—SHEET 1.
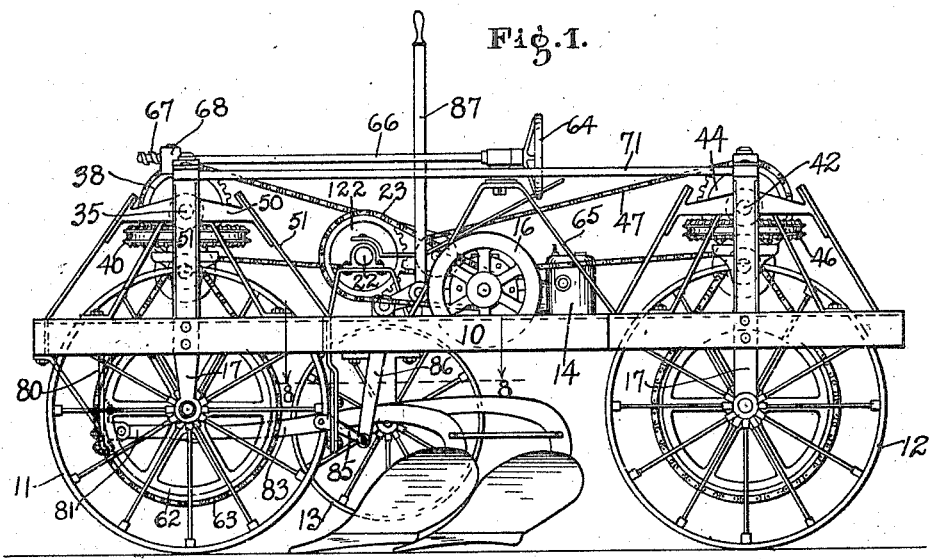
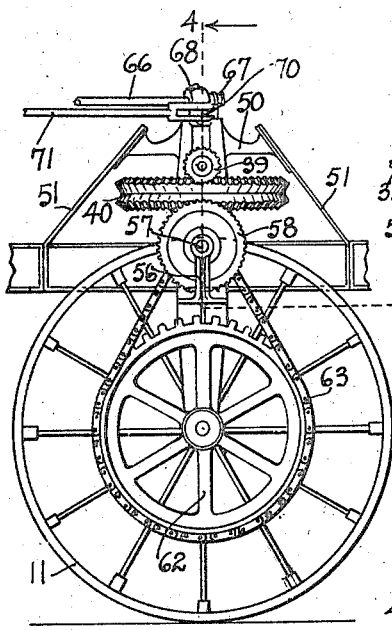
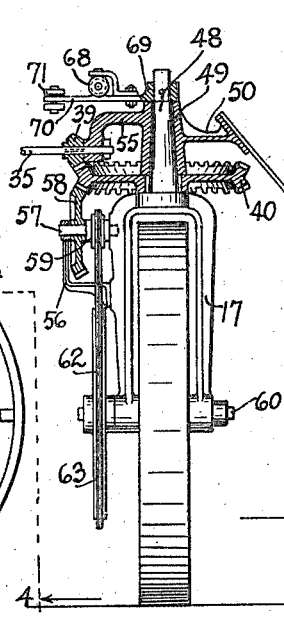
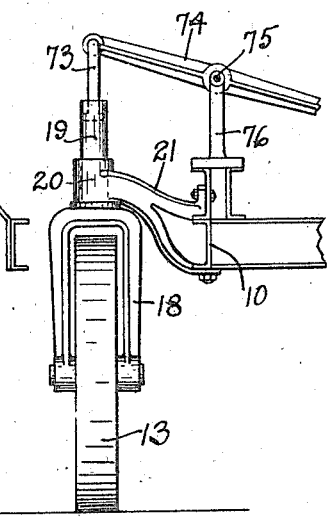
WITNESSES:
A. H. Edgerton
O. M. McLaughlin
INVENTOR.
Henley Eversole.
BY
T. H. Lockwood
ATTORNEY.

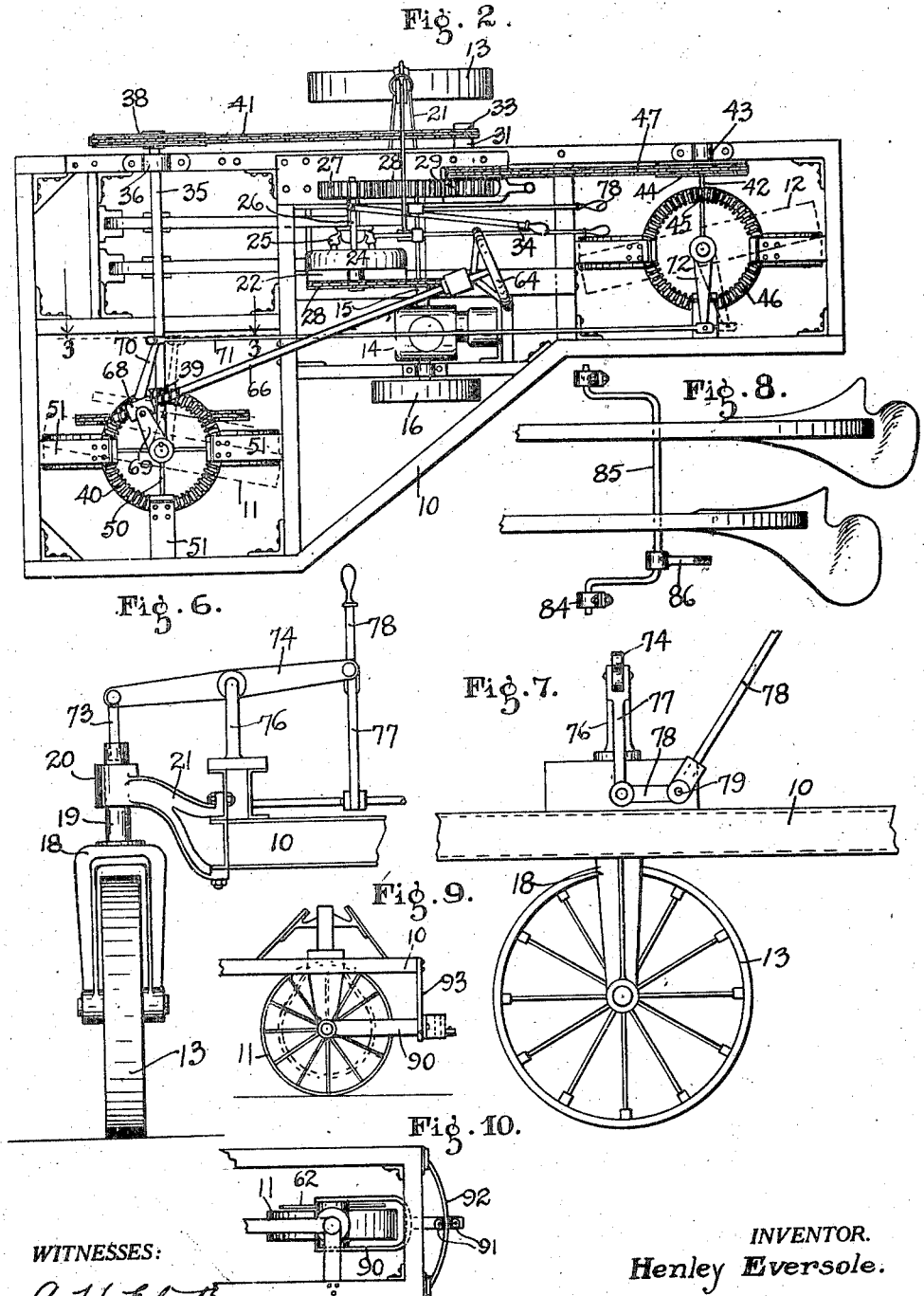

UNITED STATES PATENT OFFICE.

HENLEY EVERSOLE, OF NEWMAN, ILLINOIS.

AGRICULTURAL TRACTOR.

1,226,200.   Specification of Letters Patent.   Patented May 15, 1917.

Application filed May 31, 1912, Serial No. 700,679. Renewed February 12, 1917. Serial No. 148,249.

*To all whom it may concern:*

Be it known that I, HENLEY EVERSOLE, a citizen of the United States, and a resident of Newman, county of Douglas, and State of Illinois, have invented a certain useful Agricultural Tractor; and I do hereby declare that the following is a full, clear, and exact description thereof, reference being had to the accompanying drawings.

The object of this invention is to provide an improved short turned tractor, particularly adapted for agricultural use.

The chief feature of the invention lies in so mounting the driving wheels which carry practically the entire weight of the machine that they will travel upon the hard and unplowed ground at the bottom of the furrow while the third or idler wheel upon which but little weight comes, travels on the unplowed ground and thus a mashing down or a packing of either the ground to be plowed or that which has just been plowed, will be prevented.

Another feature lies in the manner of applying power to the driving wheels and in the means for guiding said wheels whereby they may be turned in opposite directions and effect a very short turn of the tractor, causing it to be pivoted practically upon the third or idler wheel.

Still another feature lies in the manner of attaching the plows beneath the tractor frame and in elevating the same together with the means for controlling the relation of the idler wheel with respect to the main frame.

The nature of the invention will be understood from the accompanying drawings and the following description and claims:

In the drawings, Figure 1 is a side elevation of my invention shown in connection with a gang of breaking plows and with said plows shown in their lowest positions. Fig. 2 is a plan view of the same. Fig. 3 is a vertical section on the line 3—3 of Fig. 2, showing one of the driving wheels. Fig. 4 is a section on the line 4—4 of Fig. 3. Fig. 5 is a section on the line 5—5 of Fig. 2, showing the idler wheel in elevation and held in its uppermost position. Fig. 6 is a section similar to Fig. 5, but with the wheel partly lowered. Fig. 7 is a side elevation of Fig. 6. Fig. 8 is a section on the line 8—8 of Fig. 1, showing the means for elevating the plow. Fig. 9 is a side elevation of a modified form of driving wheel mounting showing means for stiffening the fork parts being omitted. Fig. 10 is a plan view of the same.

In detail there is shown in the drawings a tractor having a frame 10, driving wheels 11 and 12, and an idler wheel 13 and carrying an engine 14 having a crank shaft 15 and fly wheel 16, power from said engine being applied for the propelling of the tractor.

The main frame 10 may be said to be composed of a trapezoidal central portion with rectangular end portions secured to the two parallel sides of the trapezoid so that one side of the frame is in alinement and the forks 17 of the driving wheels 11 and 12 are vertically mounted within these rectangular portions of the frame and upon opposite sides thereof so that said driving wheels will not drive in the same furrow at the same time, see Fig. 2. The upper end 19 of the fork 18 for the idler wheel 13 may reciprocate in the head 20 upon the outer end of a bracket 21 secured to the straight side of the frame substantially midway between its ends.

The crank shaft 15 of the engine 14 carries a sprocket wheel upon one end and there is a sprocket wheel 122 secured to a clutch shaft 22 with a chain 23 surrounding said sprockets. One portion 24 of the friction clutch is also secured to the shaft 22 and the other portion 25 of said clutch is operably secured to one end of a shaft 26 upon the other end of which there is a gear 27. Said gear 27, through an intermediate gear 28, drives a gear 29 secured on a transverse shaft 31 which carries sprocket wheels 32 and 33. The movable member 25 of the clutch is operated by means of a hand lever 34. There is a transverse driving shaft 35 having a bearing 36 upon the forward portion of the frame with a sprocket wheel 38 upon its outer end and a beveled pinion 39 upon its inner end which meshes with one face of a doubly beveled gear 40, as hereafter described, and there is a chain 41 surrounding the sprocket wheels 33 and 38 for driving said beveled gear. There is a similar construction to that just described upon the rear portion of the frame 10, that is, there is a transverse shaft 42 supported in a bearing 43 and carrying near said bearing a sprocket wheel 44 and upon its opposite end a beveled pinion 45 which meshes with a doubly beveled gear 46 for driving the rear driving wheel 12 and there is a chain 47 surrounding the two sprocket wheels 32 and 44.

The driving wheels 11 and 12 are mounted in similar forks 17, the upper end 48 of which is slightly coned and has a bearing in a spider 49 which has three downwardly extending arms 50 to which are secured upwardly and inwardly extending arms 51, the lower ends of which are rigidly secured to the rectangular portion of the frame. This mounting for the two wheels is exactly the same. The doubly beveled gear 40 is secured to the upper portion of the fork just above its head and immediately beneath the spider 49 and the beveled pinion 39 upon the shaft 35 meshes with the upper set of teeth thereon, as heretofore described. The inner end of the shaft 35 projects beyond the beveled pinion 39 and has a bearing in an extension 55 from the spider 49. There is a bracket 56 secured to the left-hand side of the fork 17, as shown in Fig. 4, which affords one bearing for a shaft 57 upon which is mounted a beveled gear 58 and a sprocket wheel 59. The other end of said shaft 57 has a bearing in the fork, see dotted lines in Fig. 4. The axle 60 for the driving wheel is secured to said wheel and extends beyond the fork 17 upon one side and near its extremity a sprocket wheel 62 is secured with a chain 63 operatively connecting said sprocket and the sprocket 59 upon the shaft 57. Thus it will be noted that when the shaft 35 is driven the beveled pinion 39 will drive the doubly beveled gear 40 and thus, through the beveled gear 58, sprocket wheels 59 and 62 and the chain 63, the wheel 11 will be driven.

A steering wheel 64 is mounted on a frame 65, the lower ends of which are secured to the frame 10 and a shaft 66 from said steering wheel extends obliquely toward the forward end of the machine and near its end there is a threaded portion 67 upon which a nut 68 works and there is a crank 69 secured to the extreme upper end of the fork 17 which has a pivotal connection with said nut 68. An arm 70 is rigidly secured to the crank 69 and to the outer end is pivotally connected a reach rod 71 which extends toward the rear end of the machine and is pivotally connected to the outer end of a lever 72 rigidly secured to the extreme upper end of the fork for the rear driving wheel 12. Thus it will be noted that when said steering wheel 64 is turned, the nut 68 will be moved longitudinally thereof, but will be kept from turning by its pivotal connection with the lever 69 and by the rod 70 which is connected to the reach rod 71 and said wheels 11 and 12 will be caused to swivel about their axis in the spider 49, but said wheels will swivel in opposite directions and when power is being applied to the wheel, this will cause the tractor to turn in a very short space, practically turning upon the idler wheel 13 as a pivot.

The upper end 19 of the fork 18, before mentioned, is cylindrical and is free both to turn and to move through the head 20 upon the outer end of the bracket 21, as before mentioned, and there is a short link 73 secured to the upper end which is pivotally connected to the outer end of a lever 74 which is fulcrumed at 75 upon a bracket 76 secured to the frame 10. The inner end of said lever is pivotally secured to one end of a link 77, the other end of which is pivotally connected to one end of a bell crank lever 78 which is pivoted at 79 to the frame. By elevating the free end of said bell crank lever, the inner end of the lever 74 will be depressed and the outer end being raised, will elevate the wheel 13. Any desired means may be used for securing said bell crank lever for the purpose of holding the idler wheel in any position desired.

There is a downwardly extending bracket 80 near the forward end of the frame to which one end of a link 81 is pivotally secured, the other end thereof being pivotally secured to a connection 82 to which the forward ends of the plow beams 83 are so mounted that the forward driving wheel 11 will travel in the furrow which was turned by the preceding passage of the tractor, while the wheel 12 will travel in the furrow being turned by the plow nearest the straight side of the frame 10. There are two downwardly extending bars 84 near the forward end of the trapezoidal portion of the frame 10 on the lower end of which a U-shaped bar 85 is pivotally mounted. Said bar extends beneath the beams 83 of the plows and the lower end of a bar 86 surrounds said U-shaped rod 85 with its upper end pivotally secured to a bell crank lever 87 which is pivoted upon a frame, as shown in Fig. 1. Thus by throwing the bell crank lever 87 to its forward position, the bar 86 and the U-shaped rod will be dropped and allow the plow shares to fall to their desired position. Provision may also be allowed for holding the free end of the bell crank 87 in any desired position for regulating the depth of the furrow to be turned, or for holding the shares entirely above ground. When, however, it is desired to hold the shares above ground, it is desirable that the idler wheel 13 be thrown to its lowest position. Also when it is desired for the tractor to travel along the roadway, the idler wheel will be thrown down so that its lower edge is on a level with the driving wheels.

In Figs. 9 and 10, there is shown means for stiffening the forks of the driving wheels. The forks 17 and the means for applying power to the wheels are the same as that heretofore described except that the axle 60 is slightly longer and the ends extend through a fork 90 which lies in a horizontal position and carries rollers 91 upon its outer end which are adapted to bear against a curved track 92 supported by brackets 93 from the frame 10. It will be readily understood that by this construction the forks 17 will be greatly stiffened and on striking an obstruction there is less chance of bending the head of the fork.

I claim as my invention:

1. A tractor including a main frame, plows carried by said frame for plowing, supporting wheels, one of which is adapted to travel in the furrow in advance of a plow and another wheel adapted to travel in the furrow behind the plow, means for steering said furrow wheels, means for propelling said furrow wheels and a vertically adjustable swivel wheel at one side of the frame arranged as and for the purpose set forth.

2. A tractor including a main frame, supporting wheels therefor located at each end of the frame and said wheels mounted so that they can be turned simultaneously for steering, means for driving said wheels, means for steering them simultaneously in opposite directions, plows mounted in connection with said frame between said wheels so that one of said supporting wheels will travel in the furrow in advance of a plow and the other wheel will travel in the furrow behind a plow, and a vertically adjustable swivel wheel mounted in connection with the frame to one side of said supporting wheels so as to travel on the unplowed land.

3. A tractor including a main frame, a supporting wheel therefor, a yoke carrying said wheel with an upward projection pivoted to said frame so that the yoke and wheel may oscillate, means connected with said yoke for steering the wheel, a double horizontal gear mounted on the projection of said yoke concentrically with the axis thereof, a power shaft mounted in said frame, a pinion thereon meshing with the upper bevel of said horizontal gear, a vertical gear mounted in said yoke meshing with the lower part of said double gear, means for transmitting power from said last-mentioned gear to the wheel so that it may be propelled while it is being steered and a vertically adjustable swivel wheel at one side of the frame arranged as and for the purpose set forth.

In witness whereof, I have hereunto affixed my signature in the presence of the witnesses herein named.

HENLEY EVERSOLE.

Witnesses:
G. H. BOINK,
E. H. MAYO.